(12) United States Patent
Spiegel et al.

(10) Patent No.: US 6,447,952 B1
(45) Date of Patent: Sep. 10, 2002

(54) POLYMER ELECTROLYTES

(75) Inventors: Ella F. Spiegel, Louisville; Anthony F. Sammells; Kresimir Adamic, both of Boulder, all of CO (US)

(73) Assignee: Eltron Research, Inc., Boulder, CO (US)

( * ) Notice: Subject to any disclaimer, the term of this patent is extended or adjusted under 35 U.S.C. 154(b) by 19 days.

(21) Appl. No.: 09/587,439

(22) Filed: Jun. 5, 2000

Related U.S. Application Data
(60) Provisional application No. 60/137,870, filed on Jun. 7, 1999.

(51) Int. Cl.$^7$ ................................................ H01M 4/58
(52) U.S. Cl. ..................... 429/218.1; 429/306; 429/310; 429/311; 429/313; 429/317; 429/219; 429/220; 429/223; 429/224; 429/231.1; 429/231.2; 429/231.5; 429/231.95; 252/62.2
(58) Field of Search ................................. 429/306, 310, 429/311, 313, 317, 218.1, 219, 220, 223, 224, 231.1, 231.2, 231.5, 231.95; 252/62.2

(56) References Cited

U.S. PATENT DOCUMENTS

| | | | | |
|---|---|---|---|---|
| 5,731,104 A | * | 3/1998 | Ventura et al. | ............. 252/62.2 |
| 6,162,563 A | * | 12/2000 | Miura et al. | ................. 429/309 |
| 6,180,287 B1 | * | 1/2001 | Watanabe et al. | ........... 429/312 |

OTHER PUBLICATIONS

Spiegel et al. "Novel polymer electrolytes for secondary lithium batteries" Proc. Power Sources Conf., 38$^{th}$, pp. 258–261, 1998.*

Zhu, Z. et al. "Synthesis of Polysiloxanes Bearing Cyclic Carbonate Side Chains, Dielectric Properties and Ionic Conductivities of Lithium Triflate Complexes"; (1994) *Macromolecules* 27:4076–4079.

* cited by examiner

*Primary Examiner*—Laura Weiner

(74) *Attorney, Agent, or Firm*—Greenlee, Winner and Sullivan, P.C.

(57) ABSTRACT

This invention provides alkali ion conducting polymer electrolytes with high ionic conductivity and elastomeric properties suitable for use in high energy batteries. The polymer electrolytes are cyclic carbonate-containing polysiloxanes that can be modified with a cross linker or chain extender, and an alkali metal ion-containing material dissolved in the carbonate-containing polysiloxane. The cyclic carbonate-containing polysiloxanes may be prepared by reacting derivatized polysiloxanes with chain extending and/or crosslinking agents. The invention also provides batteries prepared by contacting an alkali metal anode with an alkali metal intercalating cathode and an alkali ion-conducting polymer electrolyte. As one example, polymers prepared from poly {3[2,3-(carbonyldioxy)propoxy]propyl]methyl siloxane, a polysiloxane with cyclic carbonate side chains, have shown promising results for battery applications. This polymer was crosslinked with methyltriacetoxy silane and incorporates lithium trifluoromethanesulfonate into the polymer matrix as the ion conductor. Polymers were prepared using various solvent systems and temperatures in order to produce a polymer film with the desired properties for this application. Each polymer made from the precursor poly {3[2,3-(carbonyldioxy)propoxy]propyl]methyl siloxane exhibits a glass transition temperature ($T_g$) in the range of $-100°$ C. to $-70°$ C. and ionic conductivity of $6.5 \times 10^{-5}$ at 25° C. and $5.3 \times 10^{-4}$ at 60° C. which indicates that this material has distinct possibilities in lithium battery applications. Materials are flexible and readily adhere to the electrode surface. Polymers are synthesized by initially forming alkyl chains which include an ester carbonic acid group. The ester carbonic acid contains the ether oxygen within the single phase polymer matrix which facilitates the ionic dissociation of lithium salts. Ester carbonic acids groups are formed by the transesterification of alkyl diols such as 3-(allyloxy)-1,2-propanediol and 1,2 hexanediol with diethyl carbonate. This reaction produces ester carbonic acids with reactive end groups such as alkyls and alkanes which can then be further reacted to form dihalide end groups. Reactive groups on the ester carbonic acid are then reacted with various polymethyl siloxanes which serve as the polymer backbone for single phase elastomeric polymers which readily dissolve lithium salts.

31 Claims, 4 Drawing Sheets

POLYMER ELECTROLYTES

CROSS-REFERENCE TO RELATED APPLICATIONS

This application takes priority under 35 U.S.C. §119(e) from United States provisional application serial No. 60/137,870, filed Jun. 7, 1999.

STATEMENT REGARDING FEDERALLY SPONSORED RESEARCH OR DEVELOPMENT

This research was sponsored in part by the DOD Army Research Development & Engineering Center, DOD Contract DAAB07-98-C-G005. The United States Government has certain rights in this invention.

BACKGROUND OF THE INVENTION

With the increasing popularity and demand for portable electronic devices for computing, communication, and entertainment, the need for batteries for use in such portable applications has also increased. There is a particular need for rechargeable, i.e., secondary batteries, in portable device applications. Batteries that are reliable, long-lasting, low-cost, and environmentally friendly, yet which possess both high energy and power densities are most desirable. There is a particular need for high energy density secondary batteries for use in portable military applications. Batteries that exhibit energy and power densities of up to about 110 Wh/kg and 40 W/kg, respectively, at an operating current density of about 20 mA/cm$^2$ are preferred for military applications.

In theory, alkali metal batteries, most importantly those where the alkali metal is lithium, utilizing an alkali metal anode, an alkali metal ion-conducting polymer electrolyte and an alkali metal-intercalating cathode, can provide secondary batteries for portable applications and meet the preferred performance characteristics for portable military applications. However, the application of polymer electrolytes in electrochemical cells, particularly in battery construction, has been restricted by inadequate ionic conductivity of the electrolyte. Most materials that have been examined possess values between 10$^{-9}$ to 10$^{-5}$ S/cm at room temperature. Target ionic conductivities to meet preferred performance characteristics under ambient conditions, are in the 10$^{-3}$ to 10$^{-2}$ S/cm range. The most widely studied material, poly(ethylene oxide) (PEO), incorporating lithium salts such as LiClO$_4$ and LiCF$_3$SO$_3$, demonstrated ionic conductivities well below the 10$^{-3}$ S/cm target at room temperature (Berthier, C. et al. (1983) Solid State Ionics 11:91; Shi, J. and Vincent, C. A. (1993) Solid State Ionics 60:11; Chang, W. and Xu, G. (1993) J. Chem. Phys. 99:2001; Torell, L. M. et al. (1993) Polym. Advan. Technol. 4:152).

Polymer blends and copolymers of various linear and cross-linked polymers have been examined as polymer electrolytes (Li, N. et al. (1992) J. Appl. Electrochem. 22:512; Prabhu, P. V. S. et al. (1993) J. Appl. Electrochem. 23:151; Takeoka, H. A. and Tsuchida, E. (1993) Polym. Advan. Technol. 4:53), including poly(vinyl acetate) (Greenbaum, S. G. et al. (1985) Solid State Ionics 18–19:326), poly(dimethyl siloxane) (PDMS) based matrices (Greenbaum, S. G. et al. (1986) J. Appl. Phys. 60:1342), propylene carbonate or ethyl carbonate (Abraham, K. M. and Alamgir, M. (1990) J. Electrochem. Soc. 137:1657; Alamgir, M. et al. (1991) in "Primary and Secondary Lithium Batteries," K. M. Abraham and M. Solomon (eds.), Electrochem. Soc. Proc. Ser. PV91–3:131; Alamgir, M. and Abraham, K. M. (1993) J. Electrochem. Soc. 140:L96; Huq, R. et al. (1991) in "Primary and Secondary Lithium Batteries," K. M. Abraham and M. Solomon (eds.), Electrochem. Soc. Proc. Ser. PV—91–3:142; Huq, R. et al. (1992) Solid State Ionics 57:277; Huq, R. et al. (1992) Electrochim Acta 37:1681), poly(propylene oxide) (Greenbaum, G. et al. (1988) Brit. Polym. J. 20:195), and poly[bis (methoxyethoxy) ethoxy phosphazene] (MEEP) (Greenbaum, S. G. et al. (1991) Mat. Res. Soc. Symp. Proc. 210:237). Although some incremental ionic conductivity performance improvements were realized with these materials, ionic conductivities of 10$^{-3}$ S/cm at room temperature were not achieved.

Dielectric properties and ionic conductivities of lithium triflate complexes of polysiloxanes (average molecular weight 4500–5000) having certain cyclic carbonate side chains have also been examined (Z. Zhu et al. (1994) Macromolecules 27:4076–4079). These derivatized polysiloxanes were reported to be very viscous and to exhibit maximum lithium ion conductivities of 1–2×10$^{-4}$ S/cm.

Desirable features in technically useful polymer electrolytes include: i) high ionic conductivity at or close to ambient temperatures; ii) ionic transport numbers of unity or near unity for the cation of interest; iii) the ability to maintain mechanical integrity and dimensional stability within a cell subjected to electrochemical cycling; iv) environmental stability; v) the ability to maintain stable interfacial regions between electrodes; and vi) safety. There remains a significant need in the art for polymer electrolytes conductivity and mechanical properties suitable for battery applications and particularly for use as interelectrode spacers in such batteries.

SUMMARY OF THE INVENTION

This invention provides alkali ion-conducting polymer electrolytes having high ionic conductivity and improved elastomeric properties compared to currently available materials. These polymer electrolytes are useful, for example, in high energy density secondary batteries for portable electronic devices.

The polymer electrolytes of this invention consist of polymer matrices complexed with alkali metal salts. The ability of polymers, most notably polyethers, to chelate alkali metal cations is used to achieve ionic conduction within these materials. The electrolyte is formed by solubilizing an alkali metal salt in a polymer matrix which facilitates ionic dissociation and enhanced ion mobilities. The polymer electrolytes of most interest are those incorporating lithium ion salts and which exhibit high lithium ion conductivity at or below ambient temperatures. The crosslinked siloxane polymer electrolytes of this invention also possess favorable elastomeric properties for use as thin and flexible interelectrode layers for construction of battery cells and batteries.

Provided herein is an alkali ion-conducting polymer electrolyte comprising a cyclic carbonate-containing polysiloxane preferably treated with a modification agent capable of crosslinking the siloxane or extending the chain length of the siloxane, and having an alkali metal ion-containing material solubilized therein. Preferably the alkali metal ion is lithium.

The alkali ion-conducting polymer electrolytes of this invention comprise a polysiloxane derivatized with cyclic carbonate groups and preferably treated with crosslinking agents and/or polymer chain extenders (modification agents). The carbonate groups facilitate ionic dissociation and treatment with crosslinking/chain extension agents is believed to provide desirable elastomeric properties. Polymer electrolytes are prepared by treatment of a cyclic carbonate-containing polysiloxane with a crosslinking agent or a polymer chain extension agent (modification agent) in the presence of an alkali metal ion salt, preferably a lithium salt. This strategy exploits the concept that carbonate oxygens, within a single phase carbonate-siloxane polymer matrix, facilitates extensive ionic dissociation of introduced alkali metal salts, and that furthermore elastomeric behavior of the matrix under ambient temperature conditions leads to enhanced mobility of lithium ions. Polymer electrolytes having these properties permit small interelectrode distances to be achieved within portable secondary lithium batteries.

Preferred polymer electrolytes of this invention exhibit alkali metal ion conductivities in the range of $10^{-4}$ to $10^{-2}$ S/cm or higher. Preferred polymer electrolytes having these properties that are useful for applications in batteries exhibit glass transition temperatures that are lower than ambient temperature. In particular, the use of ionically conducting polymeric electrolytes facilitates the fabrication of thin-layer, flexible battery designs provided that the polymer can maintain a reliable interelectrode spacing without electronic shorting. This ability facilitates achieving low internal resistance and thereby improving electrochemical performance in terms of delivered energy density and discharge performance.

More specifically, polymer electrolytes of this invention are prepared by crosslinking or chain extension (modification) of internally derivatized polysiloxanes (I) or end dervatized polysiloxanes (II) comprising at least one derivatized Si which can be represented by:

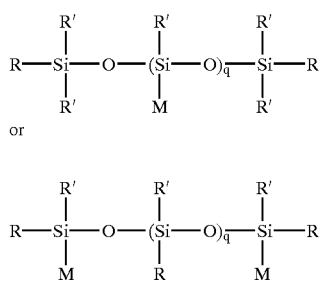

(I)

(II)

where M can be R, R' or a linked cyclic carbonate group:

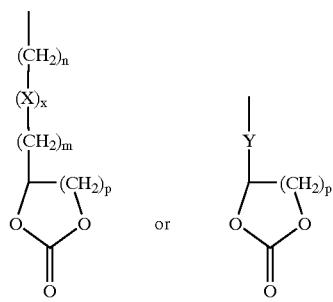

where
n and m are integers where n+m is preferably 10 or less, X is O, S, CO, OCO, or COO, x is 0 or 1, p is 1 or 2, q is a positive integer preferably 1 to about 100, r+s=q, Y is a linking group which can be a —CH$_2$— chain, a halogenated —CH$_2$— chain, or a —CH$_2$— chain or a halogenated —CH$_2$— chain which contains one or more O, S, CO, COO, or OCO, (e.g., ethers, thioether, esters, etc.) group wherein the —CH$_2$— chain preferably contains less than about 10 carbon atoms and at least one of M is a linked cyclic carbonate group; and R and R', independent of other R and R', can be a hydrogen, hydroxy, an alkyl alkenyl, an alkoxy, an hydroxyalkyl (e.g., —(CH$_2$)$_n$—OH, where n=1 to about 20, preferably 1 to about 6), halogenated alkyl or halogenated alkenyl group, preferably having 6 or fewer carbon atoms.

R and R' groups on the same Si atom may be the same or different groups.

The cyclic carbonate group can be covalently linked to the polysiloxane backbone using a variety of linking groups. Preferred linking groups are hydrocarbons, ethers, thioethers, esters, and ketones. More preferred linking groups are hydrocarbons and ethers. The linking groups can be halogenated, e.g., with F, Cl or Br. The cyclic carbonate can have a five- or six-member ring.

More specifically, internally derivatized polysiloxanes or end derivatized polysiloxanes include compounds of formulas:

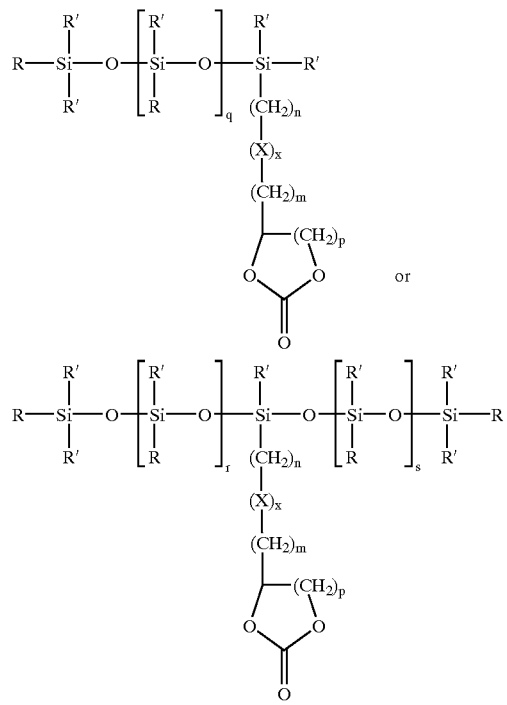

where variables are as defined above.

Carbonate derivatized polysiloxanes are crosslinked or chain-extended in the presence of alkali metal ions to obtain improved polymer electrolytes. Modifying agents are preferably silanes carrying alkoxy, alkene, and/or acyl groups, and preferably carrying ethoxy, vinyl or acetoxy groups. Polysiloxanes, such as polymethylhydrosilane, can be internally derivatized and polysiloxanes, such as silanol-terminated polydimethylsiloxane or vinyldimethyl-terminated polydimethylsiloxane, can be end-derivatized with cyclic carbonate side-chains. Preferred electrolyte polymers are crosslinked poly(alkylhydrosiloxanes) internally derivatized with cyclic carbonates. More preferred electrolyte polymers are crosslinked poly (methylhydrosiloxanes). Preferred crosslinking agents are methyltrimethoxysilane, methyltriethoxysilane, methyltriacetoxysilane, tetramethoxysilane, tetraethoxysilane, tetraacetoxysilane, vinylmethyldiethoxysilane, vinylmethyldiacetoxysilane, and mixtures thereof. More preferred crosslinking agents are methyltriacetoxysilane, tetraethoxysilane, vinylmethyldiethoxysilane, vinylmethyldiacetoxysilane, and mixtures thereof. Preferred starting polysiloxanes, i.e., prior to crosslinking, have average molecular weights ranging from about 400 to about 5000 (preferably about 1500 to about 5000) and include among others: polymethylhydrosiloxane; polydimethylsiloxane (silanol terminated); and polydimethylsiloxane (vinyl dimethyl terminated).

The starting polysiloxane is derivatized with one or more carbonate side chains with preferred internally derivatized polysiloxanes carrying from on average 0.5 to about 10 carbonate side-chains/polysiloxane. More preferred internally derivatized polysiloxanes carry on average 1 or 2 cyclic carbonate side-chain. End-derivatized polysiloxanes preferably carry on average 1 or 2 carbonate side-chains.

Polysiloxanes with cyclic bearing carbonate side chains are reacted with various crosslinkers or chain extenders to enhance the stability or elasticity of the parent polymer.

The electrolyte polymer of this invention can be prepared from a mixture of derivatized polysiloxanes having different average molecular weights, different substituents, and different cyclic carbonate side-chains and can be crosslinked or chain-extended with a mixture of crosslinking and/or chain-extending agents. Electrolyte polymers of this invention have a glass transition temperature ($T_g$) below ambient temperatures, (room temperature, or~20° C.–25° C.), i.e., about 15° C. to about –100° C. Preferred electrolyte polymers are those that exhibit $T_g$ below about –20° C. and more preferably below about –40° C.

Polymer electrolytes include solubilized alkali metal salts. Preferred salts are lithium salts, more particularly $LiClO_4$, $LiAsF_6$, and $LiCF_3SO_3$. Alkali metal salts are solublized in the polymer electrolyte to provide a homogeneous material. Polymer electrolytes incorporate alkali metal ions in a molar ratio of about 1:30 to about 1:5 alkali metal ions to cyclic carbonate groups in the polysiloxane. Preferred polymer electrolytes incorporate alkali metal ions in a molar ratio of about 1:10 to about 1:20 to cyclic carbonate groups in the polysiloxane.

The polymer electrolyte is prepared by initial reaction of the derivatized polysiloxane, modification agent, alkali metal salt and catalyst in an appropriate solvent system which is preferably selected to provide a homogeneous reaction solution. After completion of reaction, as indicated by either the decrease in the Si-H bond as determined by FTIR for the derivatization of polysiloxane and cyclic carbonate, or by other methods known to one of ordinary skill in the art, the polymer electrolyte is molded or shaped into a desired form and cured. Modification agent is typically used in excess. The preferred ranges of polysiloxane:modification agent are dependent upon the reactive groups within the derivatized polysiloxane, but typically should be within 1.5:1–2:1 carbonate polysiloxane:crosslinker. Preferred solvent systems and catalysts are also dependent upon the materials used, but for a typical polymer, acetonitrile, acetone, tetrahydrofuran, benzene and mixtures thereof are preferred solvents. In general any known crosslinking or chain-extension catalyst can be employed. Platinum divinyl tetramethyldisiloxane acetic acid or titanium (IV) triethanolaminate isopropoxide are preferred catalysts.

This invention also provides batteries employing the ion-conducting polymer electrolytes described herein. These batteries comprise a first electrode comprising an alkali earth metal; a second electrode comprising one or more transition metals; and a separator comprising an alkali ion-conducting polymer electrolyte, wherein the separator is in physical contact with both the first electrode and the second electrode. Typically, the first electrode acts as an anode, and is preferably lithium. Typically, the second electrode acts as a cathode, and preferably comprises one of the following: $TiS_2$, $LiMn_2O_4$, $LiCoO_2$, $LiNiO_2$, $Cu_xAg_yV_2O_zLi_{1.5}Na_{0.5}MnO_2$, $Li_xMnO_2$, $LiSO_2$ and $V_6O_{14}$. More preferably, the second electrode comprises $V_6O_{13}$ or $Li_xMnO_2$. The second electrode can also contain an alkali ion-conducting polymer electrolyte as a component of the electrode. The second electrode can also comprise an organo-sulfur polymer, such as 2,5-dimercapto-1,3,4-thiadiazole on a substrate.

In preferred battery construction, a film or layer of polymer electrolyte is placed in contact with the second electrode (deposited on the interelectrode cathode surface), or introduced between the electrodes. Preferred battery cells comprise an anode and a cathode separated by a layer of polymer electrolyte. The polymer layer is preferably 0.05 to 0.15 mm thick, more preferably about 0.1 mm thick. Preferred batteries have an overall thickness of 1–4 mm. The layer of polymer electrolyte should be thick enough to avoid shorting, yet thin enough to be easily shaped or rolled to fit into a confined space and still be operable.

Other applications for the polymer electrolyte include rechargeable lithium batteries, communication devices and various other portable electronics that can utilize light weight, compact, high energy density batteries.

DETAILED DESCRIPTION OF THE INVENTION

Figure 1:
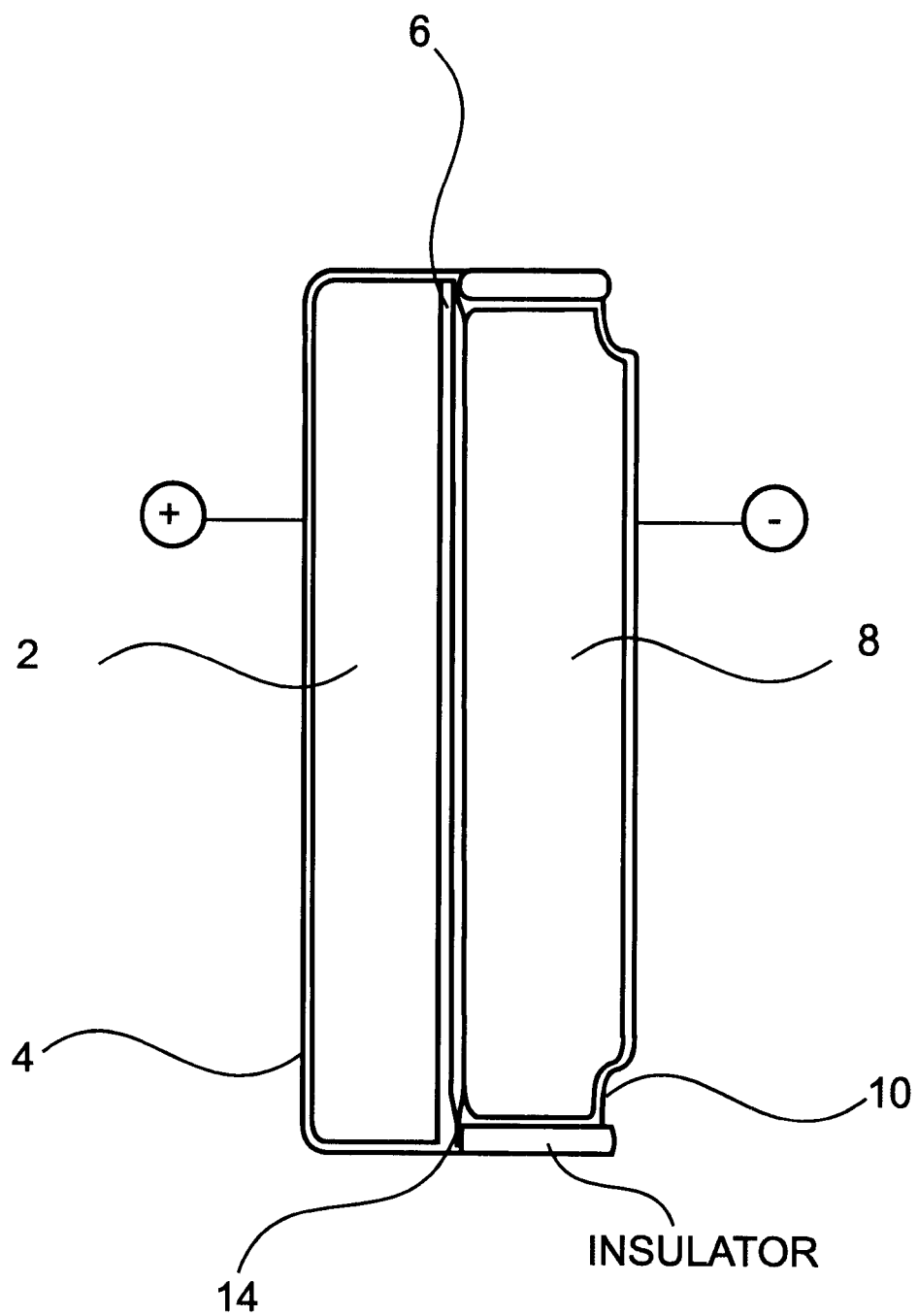
FIG. 1 is a schematic of a battery design employing a polymer electrolyte of this invention.

The following definitions are used herein:

"Modification agent" is a generic term for a chemical reagent that functions as a polymer chain extender or crosslinker. In general any reagent that can extend the chain of or crosslink a polysiloxane is included in this term. Preferably modification agents are silanes carrying reactive groups that function for chain-extension or crosslinking. Note that a given reagent may function for both chain-extension and crosslinking. Specific examples of modification agents include methyl triacetoxy silane, vinylmethyldiethoxy silane, tetraethoxy silane, and vinylmethyldiacetoxy silane. A modification agent may include both a crosslinking and a chain-extension agent. The phrase "treatment with a modification agent" refers to both crosslinking and/or chain extension and includes sequential treatment with crosslinking and/or chain extension agents. "Treatment" with either crosslinking agent or a chain-extension agent refers to standard or known methods using conventional reaction conditions and adaptations thereof in view of specific examples herein.

"Polysiloxane" is a material which contains a substituted Si—O repeating unit as its backbone, see exemplary formulas above. End-Si—O groups have three substituents on the silicon and internal Si—O groups have two substituents on the silicon. Substituents are for the most part H or hydrocarbons, particularly alkyl groups and more particularly small alkyl groups. Substituents can also include reactive groups that can be derivatized as described herein particularly with cyclic carbonate groups. In reference to "cyclic" carbonates, the term includes both five- or six-membered rings.

The term "alkali metal ion-containing material" is used generically herein to refer to a material, particularly a salt, that contains an alkali metal, and can be the alkali metal itself. The alkali metal ions are dissolved in the polymer matrix.

As used herein, "dissolved" means incorporating of one material in another material, and can include partial dissolution as well as full dissolution.

The term "thin" as used herein with respect to polymer layers and film means about 0.03 to 0.2 mm.

As used herein, "intercalation" means incorporation of one substance into another substance. For example, an "alkali metal intercalating cathode" is a cathode that has an alkali metal incorporated in it, or can also be a cathode that is capable of having an alkali metal incorporated in it.

The term "physical contact" is employed in reference to the polymer electrolyte layer separator in batteries positioned between anode and cathode. This term can include full contact, i.e., where all surfaces of one material touch another material, or partial contact. Contact is sufficient if the function of the separator is achieved. As used herein, "coated" can include a full coat of material, i.e., no holes or voids, or can include a coating with holes or voids. As used herein, "layer" can include one or more monolayers of substance, and can also include layers that have holes or voids.

The invention may be performed using a variety of different materials and under a variety of different conditions. The following examples are provided to further illustrate the invention, but should not be construed as limitations on the scope of the invention.

EXAMPLES

Example 1:
Synthesis of Polymer Electrolytes Materials

Lithium trifuoromethane sulfonate, acetonitrile, diethyl carbonate, potassium carbonate and tetrahydrofuran were purchased from Aldrich and 3-allyloxy-1,2-propanediol was purchased from Fluka and used without further purification. Methyltriacetoxysilane, poly(methylhydrosiloxane, and platinumdivinyltetramethyldisiloxane were purchased from United Chemical Technologies and used without further purification.

Synthesis of Polysiloxanes Which Incorporate Cyclic Carbonate Side Chains

A schematic diagram of the two step process for the synthesis of the precursor polysiloxane with cyclic carbonate side chains is shown in Schemes 1 and 2. The first step-in the synthesis involves the preparation of the vinyl bearing cyclic carbonate; cyclic [(allyloxy)methyl]ethylene ester carbonic acid (CAMEECA) (see below for details). This material was used as a precursor for the synthesis of poly{[3-[2,3-(carbonyldioxy) propoxyl]propyl]methyl siloxane} (PCPPMS). The terminal olefin of the CAMEECA cyclic carbonate is the active site where hydrosilation occurs. Poly(hydromethylsiloxane) was reacted with CAMEECA in the presence of platinum divinyltetramethylsiloxane to form poly {[3-[2,3-(carbonyldioxy)propoxy]propyl] methylsiloxane} (PCPPMS).

Preparation of Cyclic(allyloxy)methylethylene Ester Carbonic Acid [CAMEECA]

3.17 moles diethyl carbonate (384mL), 1.554 moles 3-(allyloxy)-1,2-propanediol (192mL) and 0.23 moles potassium carbonate (32 g, dried over $K_2CO_3$ prior to use) were added to a 1000 ml round bottom flask. The flask was equipped with a magnetic stir bar and Dean Stark trap which was used to collect one of the products which was ethanol as it formed. The reaction is shown in Scheme 1. The Dean Stark trap was fitted with a water-cooled condenser. The reaction mixture was heated to 120° C. for 24 hours while ethanol distilled out. Upon completion, the reaction mixture was cooled to room temperature and filtered to remove carbonate solids present in solution. Product was collected by vacuum distillation at 10 mm Hg reduced pressure. Three fractions were collected with the product distillate collected at 150–152° C. Product identification was confirmed by $^1$H NMR ($CDCl_3$):δ5.86 (m, 1H, C=CH), δ5.25 (m, 2H, CH2=C), δ4.81 (m, 1H, CCH(C)O), δ4.48 (m, 2H, CCH2O), δ4.05 (d, 2H, OCH2C=C), δ3.66 (m, 2H, $CCH_2O$). The product was obtained in 56.7% yield.

Preparation of Poly{[3-[2,3-(carbonyldioxy)propoxy]methyl siloxane]} [PCPPMS]

2.0039 g (0.33 mmol, mol wt. 1500) of poly (methylhydrosiloxane) (methyl terminated) [PMHS], 5.2677 g (0.033 mmol) of cyclic[(allyloxy)methyl]ethylene ester carbonic acid and 20 mL of acetonitrile were added to two-neck 150 mL round-bottom flask equipped with a magnetic stir bar, condenser and thermometer. The flask was heated to 60° C. To the stirred solution was added 4 drops of platinum divinyltetramethyldisiloxane (2–3% platinum concentration in xylene) catalyst. The reaction is shown in Scheme 2. Upon addition of platinum catalyst the solution turned cloudy and then became clear within a few minutes. Reaction was monitored by the diminishing SiH IR band at 2160cm$^{-1}$ in the FTIR spectrum. The reaction mixture was stirred and heated to allow completion of reaction (when the SiH band was minimized), followed by cooling to room temperature.

Solvent was removed by rotary evaporation, then the polymer was purified by repeated precipitation into a 90/10 (v/v) mixture of hexane and acetone. Product appeared initially as a viscous grainy solid which was then pumped on under reduced pressure for 24 hours to remove any residual solvent. Product was analyzed by $^1$H NMR analysis using acetone –$d_6$, and gave the following: δ4.96 (1H, CCH(C)O), 4.37 (2H, $CCH_2O$), 3.74 (2H,$OCH_2CO$), 3.51 (2H, $OCH_2$), 1.70 (2H, $CH_2$), 0.62 (2H, $CH_2Si$) and 0.19 (3H, $SiCH_3$).

PCPPMS can be modified with a cross linker and incorporation of lithium salts, using the following procedure. After the polymer is prepared (see above), the viscous polymer is then redissolved in a suitable solvent and a selected amount of lithium salt is added. Polymers which contain the cyclic carbonate group provide an "ether" oxygen which aids is solvation of the lithium ion into the polymer matrix. The following lithium salts were used: $LiCF_3SO_3$, $LiClO_4$ and $LiAsF_6$. At this point, several cross-linkers (including methyltriacetoxy silane and vinylmethyl diacetoxy silane) were added in varying ratios to improve the overall elasticity of the viscous polymer. Addition of crosslinker produced a flexible single phase polymer that possessed a $T_g$ below room temperature and ionic conductivities from $1 \times 10^{-4}$ to $1 \times 10^{-3}$ s/cm.

Specifically, carbonate group to lithium cation ratio was varied between about 5 to about 30. Polymer and lithium salt were typically dissolved in acetonitrile. The solution was heated to about 60° C. and stirred for about 12 hours. A three-neck, round-bottom flask can be used when making the lithium ion conducting polymer. The three-neck flask was equipped with an overhead stirrer, reflux condenser and thermometer. Upon completion, solvent was removed under reduced pressure resulting in a viscous polymer solution. Polymer was then poured onto a preheated Teflon sheet and placed in a vacuum oven which was preheated to the appropriate temperature and flushed with argon. A full vacuum was applied over a time period of several hours to avoid entrapment of solvent within the polymer matrix as it begins to dry and cure. Conditions were varied as deemed appropriate for each polymer composition that was evaluated and are readily ascertainable to one skilled in the art.

This procedure can be used to crosslink, chain extend, and incorporate lithium salts in a variety of polymers.

Preparation of Alkyl Cyclic Carbonate (cyclic [n-butyl] ethylene ester carbonic acid) [CHECA]

Synthesis of the alkyl cyclic carbonate was carried out by transesterification of the diol diethyl carbonate. The cyclic carbonate prepared during this synthesis has an alkyl chain which can be used to bond to a vinyl terminated group of a polydimethyl siloxane. This reaction is shown in Scheme 3. A two-neck round-bottom flask was equipped with a Dean Stark trap condenser assembly and a thermometer to monitor reaction temperature. Reactants 1,2 hexane diol and diethyl carbonate are combined in a 1:3 molar ratio, respectively, in an appropriate solvent followed by addition of $K_2CO_3$ to facilitate reaction. The reaction mixture was stirred and heated to about 120° C. for about 24 hours followed by cooling and gravity filtration to remove solids. Product was collected by fractional vacuum distillation and characterized by $^1$H NMR.

Synthesis of Chain-extended and Crosslinked Cyclic Carbonate Polysiloxanes Preparation of Polysiloxane (vinyldimethyl terminated) with Cyclic Carbonate End Groups The vinyl-terminated siloxane is utilized in an addition reaction to the alkyl end groups of the cyclic hexane ester carbonic acid (CHECA) to promote chain extension of the polysiloxane. This reaction is shown in Scheme 4. Reactants CHECA and polymethyl siloxane—vinyl dimethyl terminated which has a viscosity of 100 Cst. were added in a 1:1 molar ratio to a 3 neck-flask equipped with an overhead stirrer, condenser and thermometer. Acetonitrile was added as the solvent and the reaction mixture was heated to about 50–90° C. When the selected temperature was reached, several drops of catalyst (platinum divinyl tetramethyldisiloxane) were added to facilitate reaction. Reaction mixture was heated and stirred for about 12 h. Solvent was removed by rotary evaporation and the product was purified by precipitation into a hexane/acetone (60/40) mixture. Purified product can be characterized by $^1$H NMR and $^{29}$Si NMR.

Lithium salts are then incorporated into the polymer matrix using procedures previously described.

Vinyl silanes promote polymer chain extension. Alternatively, the derivatized polysiloxane can contain vinyl or other alkenyl groups that promote chain extension on crosslinking. A typical reaction is shown in Scheme 5 where poly{[3[2,3-(carbonyldioxy)propoxy]propyl]methyl siloxane} is reacted with vinyl methyl diacetoxy silane in the presence of a catalyst to produce compound P1801.

Synthesis of Crosslinked Cyclic Carbonate Polysiloxanes

In general, crosslinked siloxanes are prepared by reaction of a cyclic carbonate derivatized polysiloxane with a silane crosslinking agent in solution in the presence of an alkali metal salt and a catalyst. The polysiloxane, alkali metal salt and crosslinking silane are combined in the desired molar (or weight) ratios and dissolved in an appropriate solvent system to obtain a homogeneous solution. An appropriate catalyst is added, if necessary, to promote crosslinking and the reaction mixture is heated (40–90° C. dependent upon solvent system) until the reaction is complete. The molar ratio of alkali metal to cyclic carbonate side-chain in the polysiloxane can range from about 1:30 to 1:5. The molar ratio of polysiloxane to modification agent can range from about 2 to about 1 moles carbonate-containing polysiloxane to about 0.5–2 moles modification silane.

The crosslinking reaction of poly {[3-[2,3-(carbonyl dioxy)propoxy]propyl]methyl siloxane}(PCPPMS prepared from PHMS 1500) is exemplary. PCPPMS (about 0.49 g), and methyltriacetoxysilane (about 0.24 g), $LiCF_3SO_3$ (0.11 g) are dissolved in acetonitrile (46 mL) and several drops of a catalyst (either acetic acid or Pt added to the solution. The crosslinked polysiloxane formed using acetic acid as a catalyst is designated P1303. The crosslinked polysiloxane formed using the Pt catalyst is P1301. The solution is then heated to 50° C. for about 12 h and then the temperature was raised to 60° C. for vacuum distillation. Solvent was removed by heating under vacuum until a viscous solution was obtained. The viscous polymer solution was then poured onto a Teflon (Trademark) plate to obtain an approximately 0.1 mm film thickness. The polymer film formed is then placed in a vacuum oven to remove additional solvent under an argon atmosphere for about 1 h before vacuum was applied to prevent solvent entrapment within the polymer matrix. The polymer was then cured for 24 h by heating under vacuum (25 in Hg, 70° C.). Upon completion of curing, a thin homogeneous, single-phase, translucent polymer is obtained and is characterized using differential scanning calorimetry (DSC) and ionic conductivity measurements. The poured and cured polymer material is used for assessment of conductivity and physical properties.

The composition and preparation of several electrolytes is summarized in Table 1. Ionic conductivities and glass transition temperatures and melting points of exemplary polymer electrolytes are given in Table 2. Compositions of various other cyclic carbonate siloxane polymers studied are given in Table 3. Properties of representative polymer electrolytes are given in Table 4.

Preferred polymer electrolytes are those having Tg and meeting points in the desired range. Among polymers with similar physical properties, those with the highest ionic conductivity, preferably $>10^{-3}$, are preferred for battery applications.

Example 2:

Incorporation of Preferred Polymer Electrolytes into Lithium Cells and Preliminary Electrochemical Testing In general, a battery may be assembled by positioning the anode in contact with the polymer electrolyte layer as shown in FIG. 1. A cathode (2) is shown in a cathode can (4), and a carbonate-siloxane electrolyte (6) is placed in contact with the cathode (2). An anode (lithium in the example shown in FIG. 1) (8) is placed in contact with the electrolyte (6). As illustrated, the anode can (10) can be fitted with the cathode can (4), but insulated from the cathode can (4) by insulating gasket (14). The battery cell can be sealed in a variety of ways including crimping of the anode can into the cathode can.

Figure 2A:
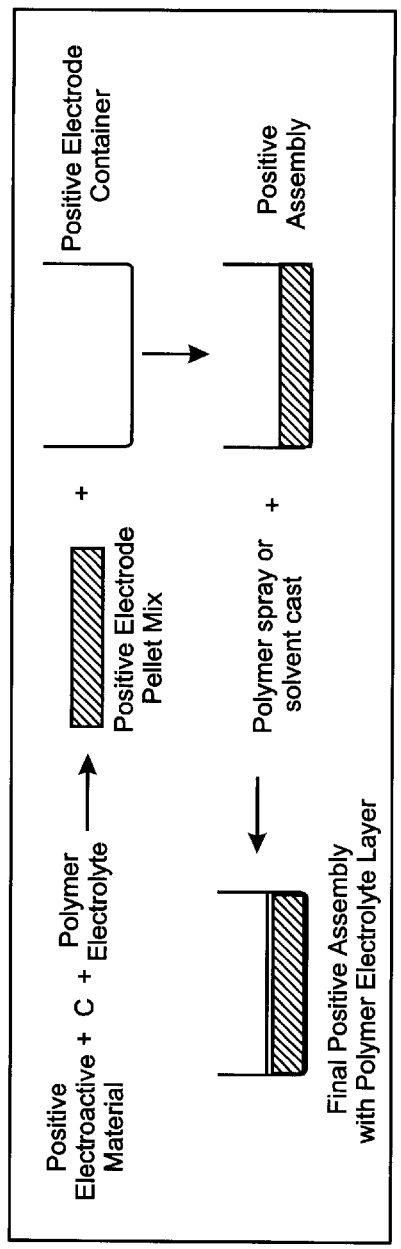
FIG. 2 is a diagram for assembly of a battery cell of this invention.

In one embodiment, the battery cell can be a hermetically sealed cell having a lithium metal anode and using the carbonate-siloxane electrolytes of this invention. The cathode can be prepared using a variety of positive electroactive materials including $V_6O_{13}$ or $LiMn_2O_4$. Referring to the steps of FIG. 2A, cathode material is formed by mixing positive electroactive material with carbon and Teflon™ to form a cathode material (e.g., as pellets) which can be pressed into a desired shape (e.g., layer as illustrated) and inserted into the cathode can. The polymer electrolyte can be layered onto the cathode material by applying pressure to create layer contact. Alternatively, the polymer electrode layer can be formed by spray or solvent casting techniques which are well-known in the art. If necessary to obtain effective contact between the cathode materials and the cathode can, a conducting cement, e.g., graphoxy cement can be inserted into the can to improve or ensure electrical contact. If spray or solvent casting is used to form the electrolyte polymer layer, residual solvent is removed under vacuum and the polymer layer is subsequently cured (by applying appropriate heating).

Figure 2B:
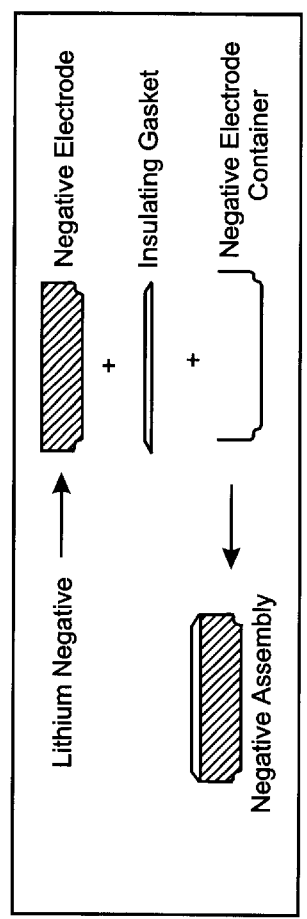

The anode can be formed by pressing the anode material (lithium) into a desired shape in the anode can as shown in FIG. 2B.

Figure 2C:
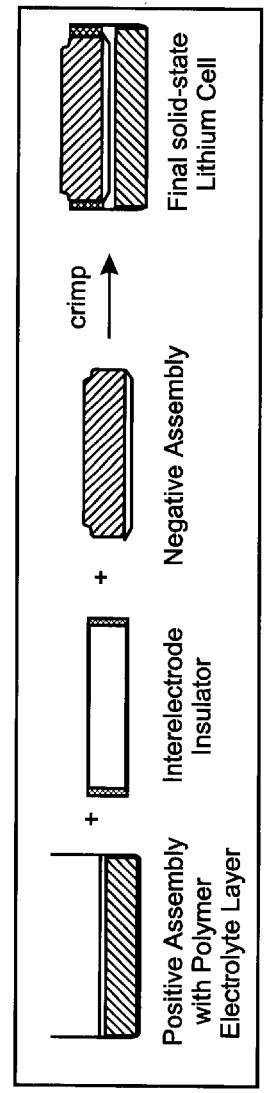

The cell is assembled by inserting an interelectrode insulating gasket (e.g., polypropylene, adjacent the inside wall of the cathode container between the polymer layer and the top of the side of the container to avoid shorting. This is shown in FIG. 2C.

Following this, the negative electrode assembly is introduced into the positive electrode adjacent to the inside wall of the previously inserted interelectrode gasket. The whole solid-state cell assembly will then be subjected to heat treatment under vacuum to both outgas any residual volatiles and to cure the polymer resulting in an exclusively lithium ion conducting bond between each of the electrode compartments. This stage will, of course, be critical in the overall cell assembly procedure and after optimization will result in avoiding the occurrence of interelectrode shorting. This will, in part, be dictated by the interelectrode spacing afforded by the insulating gasket placed on the bottom of the negative electrode assembly. The cell will be finally closed by suitable means, e.g., crimping, via the polypropylene interelectrode gasket to give a hermetic seal. The above discussion is merely meant to illustrate the general approach to be pursued. One of ordinary skill in the art will be able to use the general techniques described here and create a suitable cell.

Hermetically sealed cells of the general design shown in FIG. 2 were prepared possessing the configurations:

Li/Carbonate-Siloxane electrolyte/$V_6O_{13}$ and

Li/Carbonate-Siloxane electrolyte/$LiMn_2O_4$

All procedures at this stage are performed under an argon atmosphere. Other specific embodiments follow.

Preparation of $LiMn_2O_4$ 2.0320 g $Li_2CO_3$ (0.0271 mol) and 12.649 g (0.1100 mol) $MnCO_3$ were transferred to a 100 mL Nalgene bottle which contained 25 mL of ethanol and 4 ceramic balls. The heterogeneous mixture was ball milled for 24 hours. Ethanol was removed by evaporation and resulting powder ground and calcined by ramping 5° C./min to 800° C. and holding that temperature for 24 hours followed by cooling to ambient temperature at 5 ° C./min. Powder was ground and analyzed by XRD which confirmed as $Li_xMn_2O_4$.

Cathode constituents studied corresponded to 1) Polyethylene oxide (PEO)/$LiCF_3SO_3$ (70:30 ratio w/w); 2) (PEO/$LiCF_3SO_3$)/Carbon(vulcan VXC72RGP-3540) (50:50 ratio w/w); 3) $LiMn_2O_4$/[(PEO/$LiCF_3SO_3$)/carbon]/carbon (55:35:10 ratio w/w) and were ball-milled for 16 hours to ensure adequate mixing. If necessary, calcining can be repeated until a single-phase material is produced.

Preparation of $V_6O_{13}$

This cathode material was prepared by thermal decomposition of ammonium meta-vandate to produce a nonstoichiometric form of $V_6O_{13}$. Ammonium meta-vandate ($NH_4VO_3$) was weighed and transferred to a ceramic boat which will be placed in a furnace under an inert Ar atmosphere. Temperature was increased at a rate of 5° C./min until 450° C. and held at 450° C. for 12 hours. Upon cooling, the calcined powder is ground to a fine powder and characterized by XRD analysis to determine if a single phase $V_6O_{13}$ stoichiometry has been reached. If necessary, the powder can be calcined again until a single phase material is obtained.

$V_6O_{13}$ cathodes were prepared incorporating the lithium conducting polymer electrolyte to increase cathode Faradaic utilization and improve bonding to the polymer electrolyte. For this example, cathode constituents corresponded to 1) Polyethylene oxide (PEO)/$LiCF_3SO_3$ (70:30 ratio w/w); 2) (PEO/$LiCF_3SO_3$)/Carbon(Vulcan VXC72RGP-3540) (50:50 ratio w/w); 3) $V_6O_{13}$/[(PEO)/$LiCF_3SO_3$)/carbon]/carbon (55:35:10 ratio w/w). Each mixture was ball-milled for 16 hours to ensure adequate mixing before proceeding to the next step. Cathodes from this material were obtained by pressing the cathode mixture onto an expanded nickel mesh which acted as the substrate and current collector. The cathode mix was evenly spread onto the nickel mesh substrate to form a 1cm² electrode area followed by pressing between 10,000 and 15,000 psi. Polymer electrolyte curing within these electrodes was performed by heating under vacuum at temperatures between 90 and 120° C.

Onto one surface of the $V_6O_{13}$ cathode disk was placed a preferred carbonate-siloxane polymer electrolyte as a thin-film absent of any pinhole defects. The previous incorporation of polymer electrolytes within the cathode matrix prior to cell assembly was expected to assist in providing an effective bond at the cathode/polymer electrolyte interface. Final lithium cell assembly was performed within a dry box under an Ar atmosphere. Cells were prepared by lightly pressing a lithium electrode to the polymer electrolyte/cathode assembly.

Lithium cells prepared during performance of this task possessed the respective configurations:

Li/PO302/$V_6O_{13}$

Li/PO302/$LiMn_2O_4$

Li/P1801/$V_6O_{13}$ and

Li/P1801/$LiMn_2O_4$

These cells, which were electrochemically cycled under ambient temperature conditions possessed open circuit potentials in the ≈3.5 V range.

Example 3

Characterization of Cathode Materials X-Ray Diffraction (XRD)

Structure analysis of X-ray diffraction spectra involve calculation of the experimental interplanar spacings, d, from experimentally obtained 2θ values according to the Bragg Law equation:

$$d = \frac{\lambda}{2} \cdot \frac{1}{\sin\theta}$$

where λ is the incident X-ray source wavelength used. Interplanar spacings within the ionically conducting unit cell lattice structure are related to the lattice constants (a, b and c) for defined crystallographic systems. Microindex software (Materials Data, Inc., Livermore, Calif.) was used to determine crystallographic lattice parameters based on interplanar spacings.

Scanning Electron Microscopy (SEM)

This technique uses a high energy scanning electron beam to investigate cathodes as before and after exposure to representative operating conditions in electrochemical devices, to examine for any evidence for apparent morphological or chemical change. This was performed using a JEOL T-200 Scanning Electron Microscope. The probe beam is highly focused with low energy secondary electrons being emitted as it rasters across battery component surface of interest. These electrons are collected into a scintillator detector on a position-to-position basis with the rastered beam.

Energy Dispersive X-Ray (EDX) Measurements

This approach uses the energy of X-ray emissions following initial electron bombardment to identify elemental surface compositions on cathode component surfaces. This was performed using a Princeton Gamma Techniques, Energy Dispersive X-ray unit. The energy of X-rays emitted from the cathode surface under electron bombardment lies in the ability to map elemental surface constituent concentrations when employed in conjunction with SEM techniques previously discussed.

Example 4

Characterization of Polymer Electrolytes Glass Transition Temperature

The ability to maintain high lithium ion conductivity in carbonate-siloxane polymer electrolytes is dependent in part upon identifying polymeric materials with glass transition temperatures ($T_g$) which occur below ambient temperatures. Measurements were performed using differential scanning calorimetry (DuPont 9900 Differential Scanning Calorimeter) (DSC) over the temperature range −150 to 150° C., where polymer electrolyte transition from glassy to elastomeric state was characterized by an endothermic process. Typical operating conditions: sample size=2.9 mg; temperature ramp rate=10 C/min; inert gas=argon; gas flow rate=10 mL/min; initial temperature=−150 C and final temperature=150 C. Results are listed in Tables 2 and 4. Tables 1 and 3 list the compositions of these membranes.

Polymer Electrolyte Ionic Conductivities

The overall ionic conductivity of carbonate-siloxane lithium ion conducting polymer electrolytes prepared were interpreted by a configuration entropy model given by:

$$\sigma = AT^{-1}\exp(-B/(T-T_o)) \quad (1)$$

where A was proportional to the number of charge carriers and $T_o$ was related to the polymer glass transition temperature ($T_g$) (Armand, M. B. et al. (1979) in *Fast Ion Transport in Solids*, P. Vahista et al. (eds.), North-Holland, N.Y., p. 131; Papke, B. L. et al. (1982) J. Electrochem. Soc. 129:1694). Conductivity cells were prepared by placing polymer electrolytes between two electronically conducting gold electrodes which were deposited onto glass slides. Glass microscopic slides were first deposited with chromium using an Edwards Coating System Model E306A at 1 Å/sec until a thickness of 100 Å was deposited to provide a rough surface for the gold to adhere to. Gold was deposited at 1–2 Å/sec until a total thickness of 1000 Å was reached. A pattern was shaped from a mask which enabled four electrodes to be deposited simultaneously onto a microscopic glass slide. The area of each electrode was 0.196cm². Electrodes were positioned between two 1'×1' acrylic or Teflon plates which contained modine screws in each corner to facilitate introducing uniform pressure across the polymer electrolyte surface area.

Polymer electrolyte ionic conductivity measurements were based on the fact that the high frequency limit of the complex impedance was generally equal to electrolyte resistance (Gabrielli, C., "Identification of Electrochemical Processes by Frequency Response Analysis," Schlumberger Technical Report No. 004/83). Electrolyte conductivity, σ was then derived from series resistance, $R_s$, electrode surface area, A, and polymer electrolyte membrane thickness d, from $\sigma=d/(A \cdot R_s)$. Conductivity measurements were in support of exclusive ionic conductivity due to values being temperature dependent activation controlled over the temperature range 20 to 75° C. Ionic mobility above their glass transition temperatures indicated an activation energy of 0.2–0.7 eV as anticipated for these rubbery polymers (Olsen, I. I. et al. (1966) Solid State Ionics 83:125–133).

In these measurements the series resistance represents all ohmic contributions (i.e., current collectors, electronic resistance contributions and interfacial ohmic drop). In particular, the measured interfacial resistance was noted when cell polarization potential was varied from 0 to 3.5 V: resistance had a minimum at about 2.5 V (Olsen, I. I. et al. (1966) Solid State Ionics 83:125–133). However, this resistance contribution corresponded to ≦10% of total measured values. Impedance measurements were conducted using an electrochemical impedance arrangement comprising a PAR Potentiostat/Galvanostat Model 273 and a Schlumberger SI 1260 Impedance/Gain-Phase Analyzer. The conductivity cell was assembled in a dry box under an argon atmosphere and placed in a self-contained glass holder equipped with lead wires to make contact for both the working and counter electrode outside the cell. Upon removal from the dry box the apparatus was placed in a Faraday cage to avoid spurious electrical noise. The cell was heated by placing in ajacketed beaker through which heated oil was circulated for temperature control. The experiment was computer controlled, and complex impedance parameters acquired and analyzed by Zplot software. An ac voltage amplitude of ±10 mV was used in a potentiostat mode to ensure only a small perturbation of polymer electrolyte steady-state conditions. Since only series resistance of the electrolyte was of interest, the frequency was limited to the 100 kHz–1 Hz range. Resulting ionic conductivity values for polymer electrolytes are summarized in Table 4.

Figure 3:
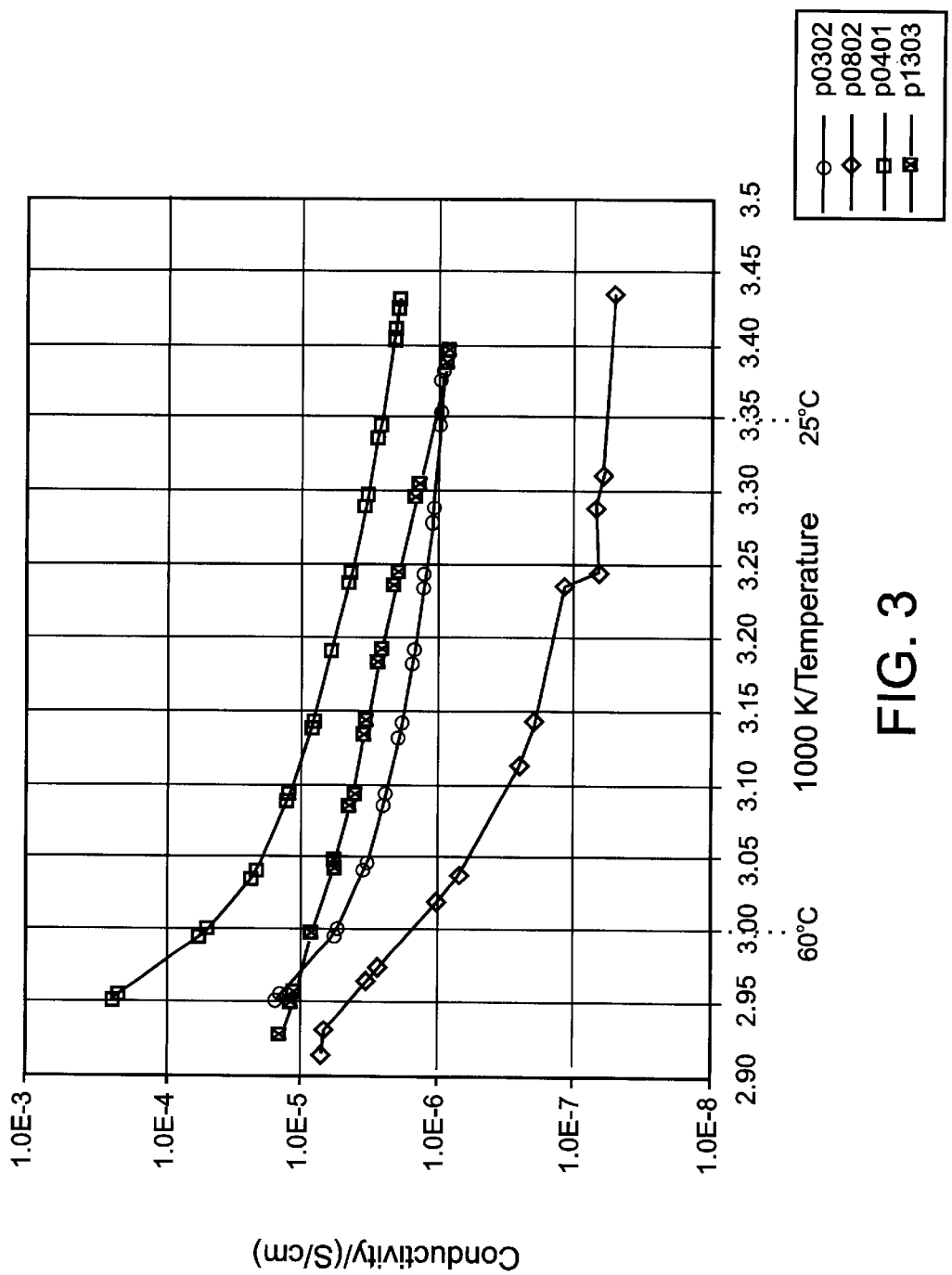
FIG. 3 is a graph comparing ionic conductivity of the various polymer compositions listed in Table 1.

FIG. 3 gives a comparison of ionic conductivity values at different temperatures for four of the polymers listed in Table 4.

Figure 4B:
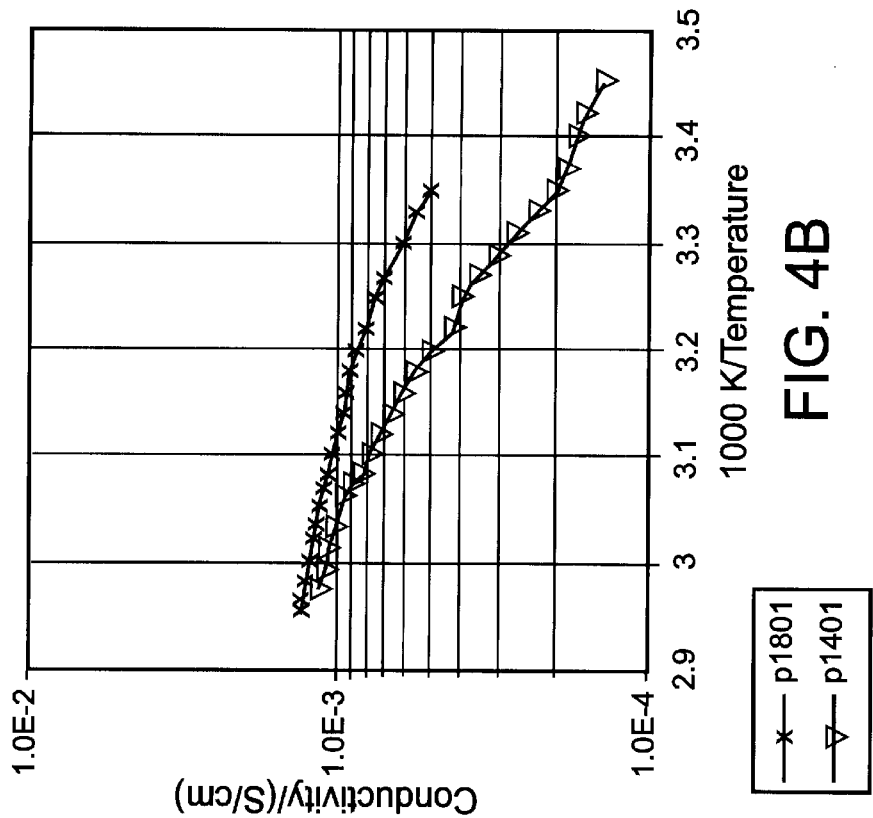
FIG. 4B is a graph comparing lithium ion conductivity of a crosslinked polysiloxane without chain extender (P1401) with that of a crosslinked polysiloxane also treated with chain extender (P1801).
Figure 4A:
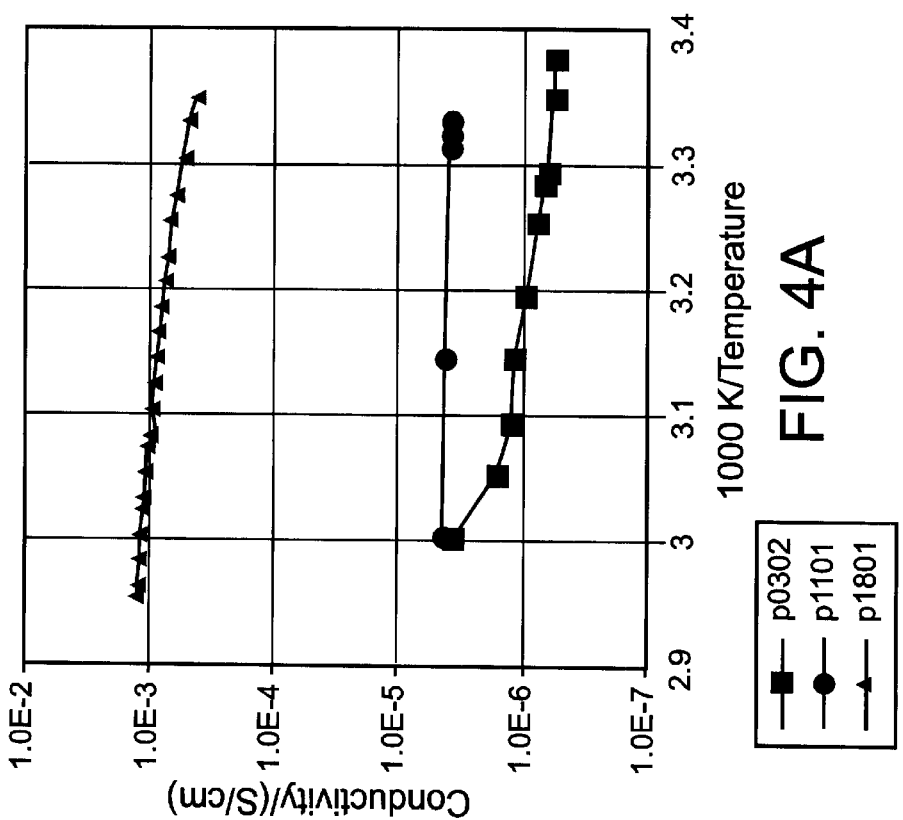
FIG. 4A is a graph comparing lithium ion conductivity of a chain extended polysiloxane (P1801) with that of polyethylene oxide (PO302) and a bisphenol A carbonate block polymer (P1101).

FIG. 4A gives a comparison of conductivity for polymer membranes consisting of polyethylene oxide (P0302), bisphenol A carbonate block polymer (P1101) and cyclic carbonate electrolyte as prepared using this invention (P1801). FIG. 4B compares two cyclic carbonate polymers: without chain extender (P 1401) and with a chain extender (P1801).

Residual Electronic Conductivity.

For the maintenance of high Faradaic efficiencies in secondary lithium cells incorporating the proposed carbonate-siloxane polymer electrolytes it will be important that the latter component possess low or no electronic conductivity. Ideally, the ionic transference number for $Li^+$ should be at or close to unity. The presence of any significant electronic conductivity in carbonate-siloxane based polymer electrolytes would, of course, result in spontaneous cell self-discharge. The presence of residual electronic conductivity will be determined by applying the Wagner polarization blocking electrode technique (Wagner, C. (1956) Z. Electrochem. 60:4; Wagner, C. (1957) Proc. Int. Comm. Electrochem. Thermno. Kinet. (CITCE) 7:361; Wagner, J. G. and Wagner, C. (1 957) J. Chem. Phys. 26:1597) to cells possessing the general configuration: $\oplus$ Li/Li$^+$polymer/Pt$\ominus$.

In these conductivity cells (under argon) it will be required that one electrode be electrochemically reversible and the other irreversible to lithium. Upon applying a potential across the conductivity cell, below that for decomposition of the polymer electrolyte, with the negative terminal of the potentiostat being attached to the reversible lithium electrode, mobile lithium ions within the polymer electrolyte will migrate to this reversible electrode and electrons to the blocking platinum electrode. Since there is no source of lithium ions from the blocking electrode, the polymer electrolyte will progressively become depleted of lithium ions. As a consequence, a concentration gradient will result for lithium ions within the polymer electrolyte. Under equilibrium conditions the flow of lithium ions due to the applied electrical gradient will be equal to that caused by the chemical gradient. At this stage, current will be carried exclusively by electrons and electron holes. Any residual electronic current will be given by:

$$I=(RT/LF) \{\sigma_e[1-\exp(-EF/RT)]+\sigma_h[\exp(EF/RT)-1]\}$$

where I is the current, L the cell constant which will be determined by the polymer electrolyte sample thickness and area, $\sigma_e$ and $\sigma_h$ the electron and electron hole conductivities, respectively, E the applied potential difference and R the gas constant. Upon rearrangement of this relationship, a plot of I\[exp(EF/RT-1] versus exp(-EF/FT) can be used to determine $\sigma_e$ and $\sigma_h \cdot \sigma_e$ will be obtained from the slope and $\sigma_h$ from the intercept on the I/[exp(EF/RT)-1] axis.

Example 5

Determining Stability of Carbonate-siloxane Polymer Electrolytes Stability to an Applied Voltage The conductivity dependence to an applied voltage will be performed under controlled atmosphere using a conductivity cell of configuration:

$\oplus$Pt/Li$^+$carbonate-siloxane/Pt$\ominus$

These cells will be exposed to voltages up to 4 V—an applied volume up to which they would be exposed in anticipated battery systems particularly upon charge. As appropriate polymers will be examined before and after exposure to these applied voltages using NMR and FTIR analysis techniques.

Chemical stability of polymer electrolytes to electroactive materials.

Successful application of polymer electrolytes in secondary batteries will be dependent upon their demonstrating chemical stability at Li/polymer and polymer/cathode interfacial regions. The long term stability of this interface will be examined with promising polymer electrolytes at their interfacial region with both negative and positive electrostatic materials using NMR and FTIR analytical techniques.

Performing viscosity measurements on polymer electrolyte constituents

The viscosity of carbonate-siloxane polymer electrolytes were measured i) directly before their curing into a polymer matrix, or ii) by systematically dissolving cured polymers in nonaqueous solution where their intrinsic viscosity will be measured.

Viscosity measurements

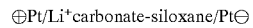

were performed utilizing a Brookfield Viscometer (ModelDV-III) because it yields rigorous viscosity data over a wide range of temperatures which can accurately be controlled. The Brookfield viscometer is a rotating spindle device immersed in the fluid sample. Sample volumes can be as small as 0.2 mL. The spindle is rotated at a constant velocity while torque is measured and viscosity calculated then recorded from the digital readout. From these values we will determine the intrinsic viscosity [$\eta$] which is defined as:

in terms of solvent viscosity $\eta_0$, the solution viscosity Ti and the solute concentration c.

Concentration will be expressed in grams of solute per 100 milliliter. Intrinsic viscosity [$\eta$] is a measure of the capacity of a polymer molecule to enhance the viscosity and is dependent upon the shape and size of the polymer molecule. Intrinsic viscosity measurements are made on cast polymers dissolved in the appropriate solvent whereas the viscosity of liquid polymer precursors will be directly measured. Intrinsic viscosity values of cast polymers allows a range for the molecular weight of each polymer electrolyte film of interest to be determined.

Measurement of critical mechanical properties of candidate elastomeric polymer electrolyte materials Lithium ion conducting polymer electrolyte materials must exhibit both high ionic conductivity and acceptable elastomeric mechanical properties if stable interelectrode regions are to be maintained in batteries. These elastomeric mechanical properties are driven primarily by the need for suitable handling and fabrication of materials into practical devices.

Tensile properties of candidate polymer electrolyte materials were measured according to ASTM D882, Standard Test method for Tensile Properties of Thin Plastic Sheeting. A razor die was used to cut specimens 100 mm long and 5 mm wide from the cured polymer film. The specimen thickness was measured and recorded to a precision of 0.0025 mm (0.0001 in).

Tensile tests were performed using an Instron 1137 test machine (Instron Corp., Canton, Mass.) equipped with a load cell with full scale ranges as low as 2 lbs. Specimen ends were gripped with pneumatic acting wedge grips, with the grip faces covered with elastomeric or other suitable material to reduce stress concentration effects at the ends. Specimen gage length was 50 mm, with a gripped length of 25 mm. Load was applied at an initial strain rate of 0.1 mm/mm/min, which corresponds to a constant crosshead rate of 5 mm/min for a specimen gage length of 50 mm. Load was monitored and recorded during the test by computer data acquisition system. Specimen extension and nominal strain may be calculated from the computer data acquisition sampling rate, the constant crosshead rate, and the initial gage length.

Nominal tensile strength was calculated by dividing the maximum specimen load or the load at break by the initial cross-sectional area of the specimen. In some materials, the load at break may be less than the maximum load, in which case both tensile strength values shall be reported. The percent elongation at break can be calculated by dividing the specimen extension at failure by the initial gage length of the specimen, and multiplying by 100. A nominal stress-strain curve was reconstructed from the load-extension data. Initial tangent modulus was calculated from the slope of the initial linear portion of the stress-strain curve, as known in the art.

Tear strength of candidate polymer electrolyte materials was measured according to ASTM D1938, Standard Test Method for Tear-Proportion Resistance of Plastic Film and Thin Sheeting by a Single-Tear Method. A razor die was used to cut specimens 75 mm long and 25 mm wide from the cured polymer film. A single clean longitudinal slit 50 mm long shall be cut with a sharp razor blade. The specimen thickness ahead of the slit was measured and recorded to a precision of 0.0025 mm (0.0001 in).

Tear strength tests were performed using the same Instron 1137 test machine. Specimen ends were gripped with pneumatic acting wedge grips. Initial grip separation were gripped with pneumatic acting wedge grips. Initial grip separation was 50 mm (2 in). The specimen was aligned in the grips such that its major axis coincides with an imaginary line joining the centers of the grips. Load was applied at a constant crosshead rate of 250 mm/min. Load was monitored and recorded during the test by computer data acquisition system for the entire time necessary to propagate the tear through the unslit 25 mm portion. Depending upon the specific behavior of the material, either the load for initial propagation of the tear, or the average load for propagation of the tear is reported. This load is reported as the tear propagation resistance force.

Tear resistance may be normalized for different film thickness, as described in ASTM D624, Standard Test Method for Conventional Vulcanized Rubber and Thermoplastic Elastomers. Tear strength, T, is given by:

$$T_s = F/t$$

where F is the tear propagation resistance force, and t is the specimen thickness.

Although the description above contains many specificities, these should not be construed as limiting the scope of the invention, but as merely providing illustrations of some of the presently-preferred embodiments of this invention. Thus, the scope of the invention should be determined by the appended claims and their legal equivalents, rather than by the examples given.

All references cited herein are incorporated by reference herein to the extent not inconsistent with the disclosure herein.

TABLE 1

| Polymer # | Polymer Composition |
|---|---|
| PO302 | PEO - 1.32 g/LiCF$_3$SO$_3$ 0.29 g |
| PO401 | PEO - 1.30 g/methyltriacetoxysilane 0.027 g/LiCF$_3$SO$_3$ 0.5939 g |
| PO802 | PEO 1.3407 g/LiCF$_3$SO$_3$ 0.5939 g |
| P1303 | Poly {3[2,3-carbonyldioxy) propoxy]propyl]methyl siloxane 0.498 (g)/acetic acid (1 drop)/LiCF$_3$SO$_3$ 0.1090 g/methyltriacetoxysilane 0.2490 g |

TABLE 2

| Polymer # | Ionic Conductivity (S/cm) (25° C.) | Glass Transition ° C. |
|---|---|---|
| PO302 | $1 \times 10^{-5}$ | −41.35 |
| PO401 | $5.1 \times 10^{-6}$ | −42.72 |
| PO802 | $5.3 \times 10^{-7}$ | −40.05 |
| P1303 | $6.5 \times 10^{-5}$ | −26.77 |

TABLE 3

Composition of Cyclic Carbonate Siloxane Polymers Evaluated

| Polymer #,+ | Polymer (g) | Crosslinker (g) | Lithium salt (g) LiCf$_3$SO$_3$ | Solvent: (ml) | Catalyst (drops) | Temp (° C.) |
|---|---|---|---|---|---|---|
| P1302 | *PCPPMS/ 0.49 | ♦MTAS/0.24 | 0.11 | THF 46 | acetic acid 1 | 50 |
| P1401 | *PCPPMS/ 0.50 | ♦MTAS/0.24 | 0.15 | ACN 15 Benzene 28 | acetic acid 2 | 50 |
| P1801 | *PCPPMS/ 0.63 | •VMDAS/0.037 ♦MTAS/0.74 | 0.116 | ACN 34 Benzene 66 | Pt/4 | 60 |

*PCPPMS Poly{[3-[2,3(carbonyldioxy)propoxy]propyl]methysiloxane
♦MTAS - methyltriacetoxysilane
•VMDAS = vinylmethyldiacetoxysilane, ACN = acetonitrile
+All of the polymers listed were prepared using PHMS having molecular weight of 1500

TABLE 4

Properties of Polymer Electrolytes Evaluated

| Polymer #+ | Ionic Conductivity (S/cm) (25° C.) | Ionic Conductivity (S/cm) (60° C.) | Glass Transition Temperature ° C. | Melting Point ° C. |
|---|---|---|---|---|
| PO302 | $6.5 \times 10^{-7}$ | $3.9 \times 10^{-6}$ | −41.35 | 63.16 |
| PO401 | $5.1 \times 10^{-6}$ | $1 \times 10^{-4}$ | −42.72 | 61.91 |
| PO802 | $5.3 \times 10^{-7}$ | $5.2 \times 10^{-5}$ | −40.05 | 61.32 |
| P1302 | $7.99 \times 10^{-3}$ | $3.69 \times 10^{-2}$ | −21.69 | 135 |
| P1401 | $2.6 \times 10^{-4}$ | $1.8 \times 10^{-3}$ | −44.2 | 124.1 |
| P1801 | $5.15 \times 10^{-4}$ | $1.24 \times 10^{-3}$ | −53.9 | 123.6 |

+All of the polymers listed were prepared using PHMS having molecular weight of 1500

SCHEME 1
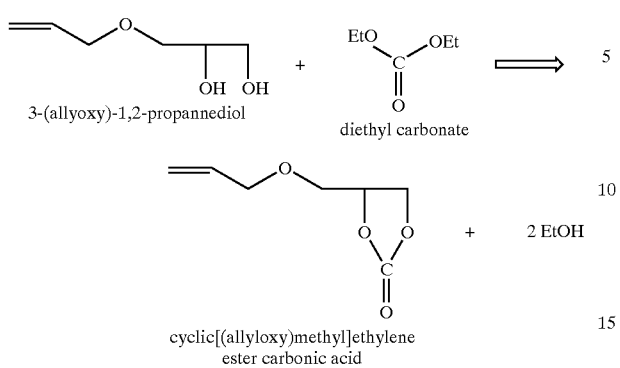
SCHEME 2
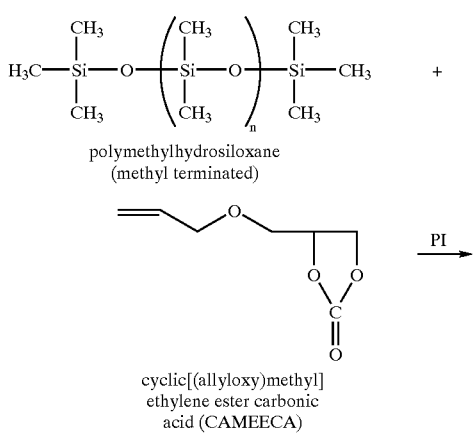
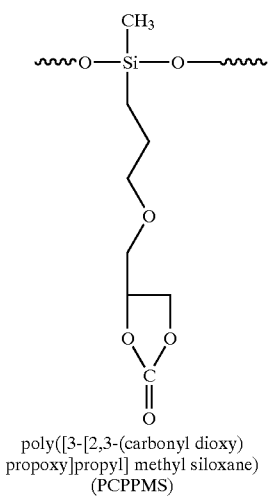
poly([3-[2,3-(carbonyl dioxy)propoxy]propyl] methyl siloxane) (PCPPMS)
SCHEME 3
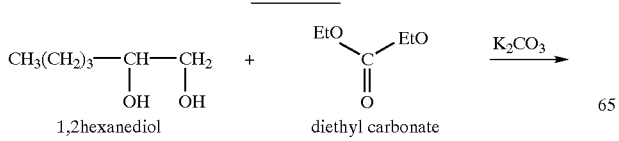
SCHEME 4
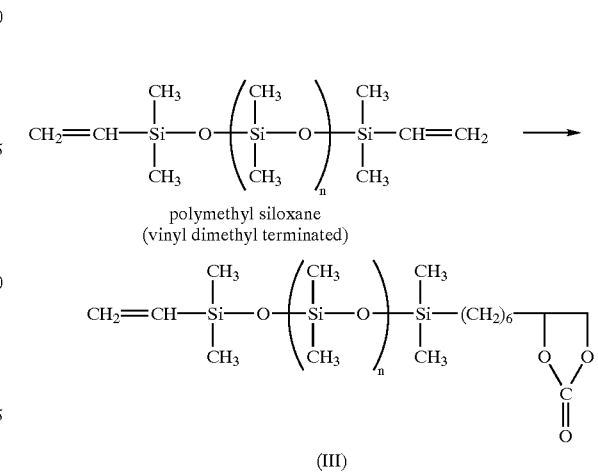
CHEA +
SCHEME 5
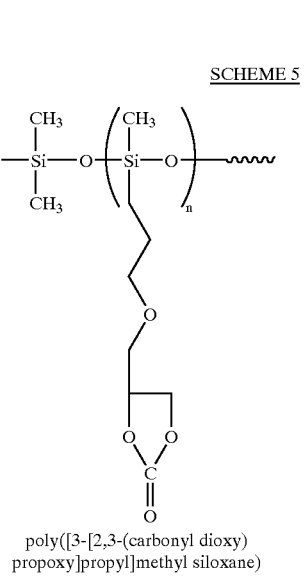
poly([3-[2,3-(carbonyl dioxy)propoxy]propyl]methyl siloxane)
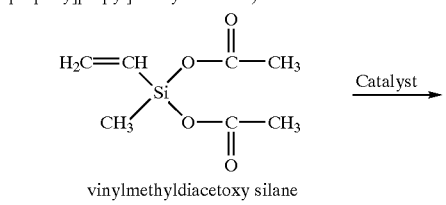
vinylmethyldiacetoxy silane  →Catalyst -continued

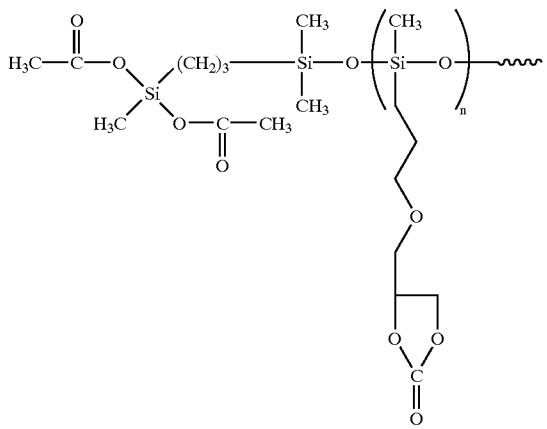

P1801

What is claimed is:

1. An alkali ion-conducting polymer electrolyte comprising:
   (a) a cyclic carbonate-containing polysiloxane having a molar ratio of about 0.5 to about 10 moles carbonate group to about 1 mole polysiloxane group; and
   (b) a modification silane capable of crosslinking the silane or extending the chain length of the silane, wherein said modification silane is present in a molar ratio of about 1.5 to 2 moles carbonate group to about 1 mole modification silane; and
   (c) an alkali metal ion-containing material wherein said alkali metal ion-containing material is present in a molar ratio of about 5 to about 30 moles carbonate group to about 1 mole alkali metal ion.

2. The polymer as recited in claim 1, wherein said polysiloxane is selected from the group consisting of: polyhydromethylsiloxane (trimethylsilyl terminated), polydimethylsiloxane (silanol terminated), and polydimethylsiloxane (vinyldimethyl terminated).

3. The polymer as recited in claim 1, wherein said cyclic carbonate-containing polysiloxane has the formula:

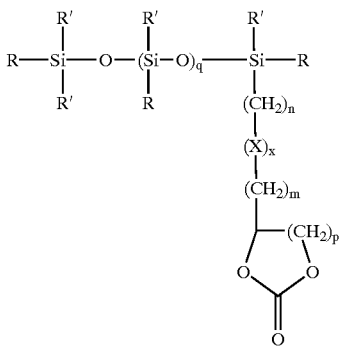

wherein each R, independent of other R in the formula, is an alkyl, alkenyl, halogenated alkyl or halogenated alkenyl group, n and m are integers where n+m is 10 or less, X is O, S, CO, OCO, or COO, x is 0 or 1, p is 1 or 2, q is 1 to 100, and each R', independent of other R' in the formula, is an alkyl, alkenyl, halogenated alkyl, halogenated alkenyl, alkanol (OH—$(CH_2)_n$—), halogen, hydrogen or hydroxy group.

4. The polymer as recited in claim 3 wherein each R is a group having 6 or fewer carbon atoms.

5. The polymner as recited in claim 3 wherein p is 1.

6. The polymer as recited in claim 1, wherein said cyclic carbonate-containing polysiloxane has the formula;

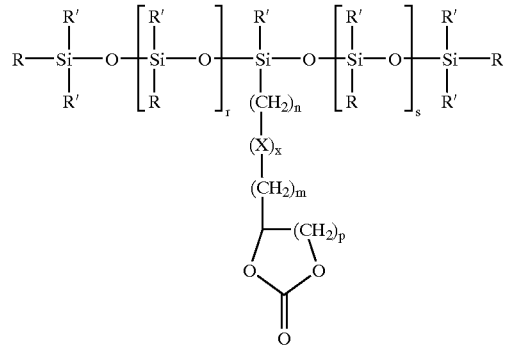

wherein R, independent of other R in the formula, is an alkyl, alkenyl, halogenated alkyl or halogenated alkenyl group, n and m are integers where n+m is 10 or less, X is O, S, CO, OCO, or COO, x is 0 or 1, p is 1 or 2, r+s is 1 to 100, and R', independent of other R' in the formula, is an alkyl, alkenyl, halogenated alkyl or halo generated alkenyl, alkanol (OH—$(CH_2)_n$—), halogen, hydrogen or hydroxy group.

7. The polymer as recited in claim 1, wherein said cyclic carbonate-containing polysiloxane is poly {[3-[2,3] (carbonyldioxy)propoxy]propyl]methyl siloxane}.

8. The polymer as recited in claim 1, wherein said alkali metal ion-containing material contains lithium.

9. The polymer as recited in claim 1, wherein said modification silane is selected from the group consisting of: alkoxy, silanes, alkanoxy silanes, alkenyl silanes and mixtures thereof.

10. The polymer as recited in claim 9, wherein said modification silane is selected from the group consisting of: methyltriacetoxy silane, vinylmethyldiethoxy silane, tetraethoxy silane, and vinylmethyldiacetoxy silane.

11. The polymer as described in claim 1, wherein the ionic conductivity of said polymer is at least $10^{-4}$ S/cm.

12. A method of using an alkali ion-conducting polymer electrolyte of claim 1 in a cell, comprising contacting an alkali metal anode with an alkali ion-conducting polymer electrolyte and an alkali metal intercalating cathode.

13. The method as recited in claim 12, wherein said alkali metal anode comprises lithium, said alkali ion-conducting polymer electrolyte comprises a cyclic carbonate-containing polysiloxane, and said alkali metal intercalating cathode comprises $V_6O_{13}$.

14. The method as recited in claim 12, wherein said alkali metal anode comprises lithium, said alkali ion-conducting polymer electrolyte comprises a carbonate-containing polysiloxane, and said alkali metal intercalating cathode comprises $LiMn_2O_4$.

15. A battery comprising:
   (a) a first electrode comprising an alkali earth metal;
   (b) a second electrode comprising one or more transition metals; and
   (c) a separator comprising an alkali ion-conducting polymer electrolyte, as described in claim 1, wherein said separator is in physical contact with both said first electrode and said second electrode.

16. The battery of claim 15, wherein said first electrode comprises lithium.

17. The battery of claim 15, wherein said second electrode is coated with a porous nickel layer.

18. The battery of claim 15, wherein said second electrode comprises a compound selected from the group consisting of: $TiS_2$, $LiMn_2O_4$, $LiCoO_2$, $LiNiO_2$, $Cu_xAg_yV_2O_zLi_{1.5}Na_{0.5}MnO_2$, $Li_xMnO_2$, $LiSO_2$ and $V_6O_{13}$.

19. The battery of claim 15, wherein said second electrode also comprises an alkali ion-conducting polymer electrolyte.

20. The battery of claim 15, wherein said second electrode also comprises a lithium-containing polymer.

21. A battery comprising:
   (a) a first electrode comprising an alkali earth metal;
   (b) a second electrode comprising an organo-sulfur polymer; and
   (c) a separator comprising an alkali ion-conducting polymer electrolyte, as described in claim 1, wherein said separator is in physical contact with both said first electrode and said second electrode.

22. The battery of claim 21, wherein said second electrode comprises a layer of 2,5-dimercapto-1,3,4-thiadiazole on a copper substrate.

23. The polymer as recited in claim 1 wherein said cyclic carbonate-containing polysiloxane has the formula:

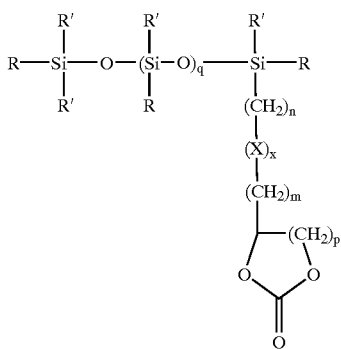

where each R, independent of other R in the formula, is an alkyl group; n and m are integers where n+m is 10 or less, X is O, S, CO, OCO, or COO, x is 0 or 1, p is 1 or 2, q is 1 to 100, and each R', independent of other R' in the formula, is an alkyl group.

24. The polymer as recited in claim 1 wherein the cyclic carbonate-containing polysiloxane contains at least one cyclic carbonate group of the formula:

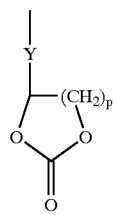

where p is 1 or 2 and Y is a —$CH_2$— chain, a halogenated —$CH_2$— chain, or a —$CH_2$— chain or halogenated —$CH_2$— chain, or a —$CH_2$— chain or halogenated —$CH_2$— chain which contains one or more O, S, CO, COO, OCO groups.

25. The polymer of claim 24 wherein p is 1.

26. The polymer of claim 24 which is an internally derivatized polysiloxane.

27. The polymer of claim 24 which is an end derivatized polysiloxane.

28. The polymer as recited in claim I wherein the cyclic carbonate-containing polysiloxane contains at least one cyclic carbonate group of the formula:

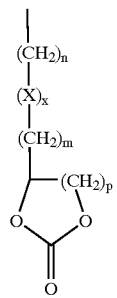

where n and m are integers and n+m is 10 or less, x is O, S, CO, OCO, or COO, x is 0 or 1, and p is 1 or 2.

29. The polymer of claim 28 wherein p is 1.

30. The polymer of claim 28 which is an internally derivatized polysiloxane.

31. The polymer of claim 28 which is an end-derivatized polysiloxane.

* * * * *

UNITED STATES PATENT AND TRADEMARK OFFICE
CERTIFICATE OF CORRECTION

PATENT NO.     : 6,447,952 B1
DATED          : September 10, 2002
INVENTOR(S)    : Spiegel et al.

It is certified that error appears in the above-identified patent and that said Letters Patent is hereby corrected as shown below:

Column 2,
Line 29, after "electrolytes", please insert -- with --.

Column 3,
Line 7, please replace "facilitates" with -- facilitate --.
Line 67, please replace "thiocther" with -- thioether --.

Column 5,
Line 17, please replace "side-chain" with -- side-chains --.
Line 35, please replace "solublized " with -- solubilized --.

Column 7,
Line 57, please replace "poly (methylhydrosiloxane" with -- poly (methylhydrosiloxane) --.

Column 8,
Line 10, please replace "Cyclic(allyloxy)methylethylene" with
-- Cyclic[(allyloxy)methyl]ethylene --.
Line 31, please replace "Poly{[3-[2,3-(carbonyldioxy)propoxy]methyl siloxanel}" with
-- Poly{[3-[2,3-(carbonyldioxy)propoxy]propyl]methyl siloxane} --.
Line 37, before "two-neck", please insert -- a --.
Line 64, please replace "aids is solvation" with -- aids in solvation --.

Column 10,
Line 26, please replace "(either acetic acid or Pt" with -- (either acetic acid or Pt) --.
Line 53, please replace "meeting" with -- melting --.

Column 11,
Line 30, please replace "(e.g. polypropylene" with -- (e.g. polypropylene) --.

Column 14,
Line 20, please replace ".derived" with -- derived --.
Lines 32-33, please replace "In . particular" with -- In particular --.
Line 47, please replace "ajacketed" with -- a jacketed --.

Column 15
Line 15, please replace "(1 957)" with -- (1957) --.
Line 16, please replace "$\oplus$Li/Li+polymer/Pt$\ominus$" with -- $\ominus$Li/Li+polymer/Pt$\oplus$ --.
Line 44, please replace "$\sigma_h \cdot \sigma_e$" with -- $\sigma_h \cdot \sigma_e$ --.

UNITED STATES PATENT AND TRADEMARK OFFICE
CERTIFICATE OF CORRECTION

PATENT NO. : 6,447,952 B1
DATED : September 10, 2002
INVENTOR(S) : Spiegel et al.

It is certified that error appears in the above-identified patent and that said Letters Patent is hereby corrected as shown below:

Column 16,
Line 24, please replace "Ti" with -- η --.

Column 20,
Circa line 18, Scheme 4 please replace "CHEA" with -- CHECA --.

Column 22,
Lines 29-30, please replace "poly{[3-[2,3](carbonyldioxy)propoxy]propyl]methyl siloxane}" with -- poly{[3-[2,3-(carbonyldioxy)propoxy]propyl]methyl siloxane} --.
Line 34, please replace "alkoxy,·silanes" with -- alkoxy silanes --.

Column 24,
Lines 12-14, please replace "Y is a -$CH_2$- chain, a halogenated -$CH_2$- chain, or a -$CH_2$- chain or halogenated -$CH_2$- chain, or a -$CH_2$- chain or halogenated -$CH_2$- chain which contains one or more O, S, CO, COO, OCO groups" with -- Y is a -$CH_2$- chain, a halogenaed -$CH_2$- chain, or a -$CH_2$- chain or halogenated -$CH_2$- chain which contains one or more O, S, CO, COO, or OCO groups --.

Signed and Sealed this

First Day of April, 2003

JAMES E. ROGAN
*Director of the United States Patent and Trademark Office*